United States Patent [19]
Wehner

[11] 3,850,442
[45] Nov. 26, 1974

[54] BOWLING BAG CART
[76] Inventor: Frank Wehner, 5806 Guatamala Way, Buena Park, Calif. 90620
[22] Filed: July 9, 1973
[21] Appl. No.: 377,359

[52] U.S. Cl. ............................... 280/47.37, 280/35
[51] Int. Cl. ............................................. B62b 3/00
[58] Field of Search ........... 280/34, 35, 79.1, 47.37

[56] References Cited
UNITED STATES PATENTS

| | | | |
|---|---|---|---|
| 2,851,180 | 9/1958 | McCabe | 280/47.37 |
| 3,331,613 | 7/1967 | Popelkd | 280/35 |
| 3,522,955 | 8/1970 | Warner, Jr. | 280/47.37 |
| 3,540,752 | 11/1970 | Anuskiewicz | 280/47.37 |
| 3,612,563 | 10/1971 | Kazmark, Sr. | 280/47.37 |
| 3,661,414 | 5/1972 | Roth | 280/35 |

Primary Examiner—Allen N. Knowles
Attorney, Agent, or Firm—Grover A. Frater

[57] ABSTRACT

A cart is disclosed by which a bowling ball bag, or any heavy load having an upper handle, may be transported right alongside the user. Steering and lifting are simplified by arranging a lifting handle directly over the cart and connecting it to the load handle so that the cart handle pivots on the load handle.

11 Claims, 6 Drawing Figures

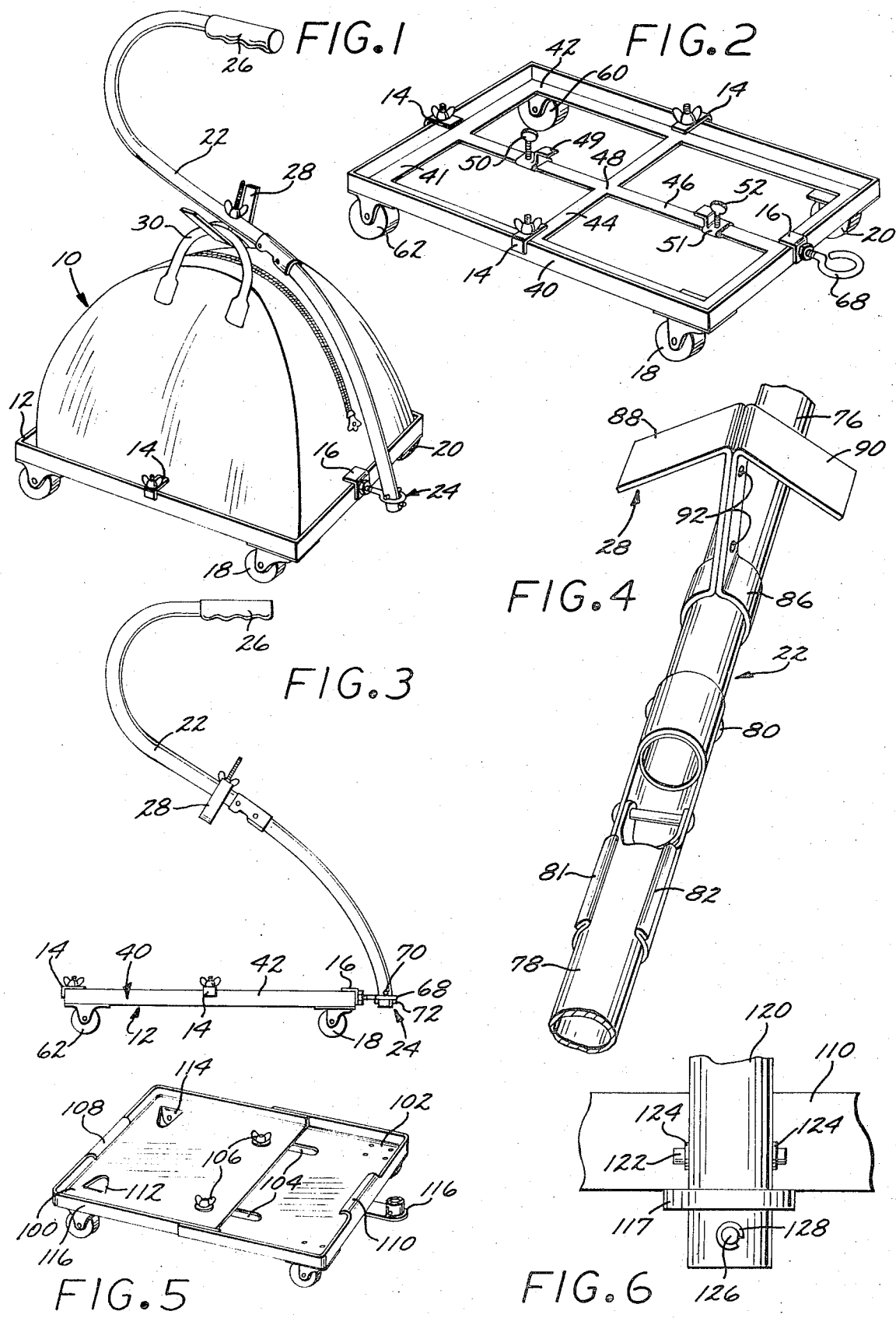

BOWLING BAG CART

This invention relates to improvements in carts. While the invention is applicable to hauling other kinds of loads, it is particularly useful for hauling bowling ball bags containing a bowling ball.

It is common to carry bowling balls in special bowling ball bags. Such bags have a handle extending upwardly to permit carrying with one hand. They are usually arranged with a flat bottom area so that the bag can rest on a horizontal surface with its handles extending upwardly ready to be grasped when the bag is to be carried away.

Bowling balls are heavy and difficult to carry over long distances. Because of that a number of attempts have been made to utilize wheels to ease the task. The problem is complicated by the fact that it is often necessary to lift the bag vertically over curbings and up stairways. Further, the player areas at bowling alley establishments are often sufficiently crowded and busy so that it is inconvenient and even dangerous to pull or push a transport cart of the kind which is drawn behind, or is pushed in front of, the user.

It is an object of this invention to provide a wheeled apparatus by which bowling ball bags and the like may be easily transported over horizontal surfaces and by which they may be easily lifted vertically at stairways and the like. It is also an object to produce a cart apparatus which proceeds directly alongside the user and which generally makes it easy and convenient to transport a bowling ball or other heavy objects.

The invention provides a cart which includes a platform of some kind. The platform is fitted with wheels. The bowling ball bag, or other load, rests on the platform. The platform is elevated only a small distance above the horizontal surface over which it is moved and it is moved by means of a handle which extends upwardly from the cart. The handle is arranged so that it can be connected to the upper part of the load. In the case of a bowling ball bag, the cart handle is arranged so that it can be connected to the upper handles of the bag. The arrangement is such that lifting on the handle results in lifting the bag by its handles as distinguished from a lifting of the bag by lifting the platform on which the bag rests. The platform is lifted, in the preferred embodiment, because it is fixed to the bag.

While the style of bowling ball bags varies greatly, the number of styles is limited. The invention is applicable to most, and possibly to all of those styles. One of its' objects is to provide a cart which can be made in a universal form that will fit all or the majority of those bag styles. Another object is to provide a cart that can be produced at relatively low cost which is safe both for the user and for those around him and which is thoroughly practical and useful for its intended purpose. Certain embodiments of the invention have been selected for illustration in the accompanying drawings. It is to be understood that the invention is not limited to those illustrated but that other embodiments of the invention are possible.

In the drawings:

FIG. 1 is a pictorial view of a cart that embodies the invention and on which a bowling ball is carried;

FIG. 2 is a pictorial view of the platform that forms a part of the cart of FIG. 1;

FIG. 3 is a view in side elevation of the cart of FIG. 1 without the bag;

FIG. 4 is a pictorial view of a portion of the handle of the cart of FIGS. 1 and 3;

FIG. 5 is a pictorial view of an alternative form of wheeled platform together with a fragment of a cart handle; and FIG. 6 is a view in front elevation of a fragment of the platform and handle shown in FIG. 5.

The bowling bag 10 shown in FIG. 1 is representative of the style of a majority of bowling ball bags. The bottom plan view is generally rectangular. In side profile it has a rounded upper edge. Most bags, like this one, are symmetrical about their longitudinal and transverse mid-planes. They open along the longitudinal mid-plane and they are provided with two bale styles handles, one secured to each of the sides, so that the bale extends above the top of the bag whereby both of the bales can be grasped with one hand. Many bags are provided with an internal locating structure that holds the bottom in rectangular shape and confines the bowling ball to a central location within the bag. It is significant that almost all of them have an upper bale handle and that the distance from the bottom of the bag to the handles is approximately the same in all bags.

Such a bag is placed on the cart so that its bottom wall rests on the cart platform with the bag handles extending upwardly. The platform is provided with wheels. The wheels on one end are free to pivot about a vertical axis when the platform is horizontal whereby the platform may be steered. One front wheel is satisfactory; two front wheels are preferred. For convenience the wheeled end is called the front end of the cart whether it is pulled or pushed.

The cart is fitted with a handle that is connected to the platform at the end of the platform where the pivoted wheels are mounted. Thus the handle is mounted on what would ordinarily be the front of the platform. The bowling ball is very heavy and, in the interest of safety, should be carried close to the ground. Accordingly the platform is low. The handle by which it is propelled extends upwardly from the platform to a position directly over the platform and bag. This arrangement makes it possible to pull or push the cart so that it proceeds directly alongside the user thereby to minimize the possibility that bypassers will not see the cart and stumble into it. Moreover the fact that the handle is fitted with a grip portion positioned directly over the bag and platform makes it possible to lift the bag and platform up over a curb and up a stairway by simply lifting it vertically when the curb or step is reached.

The handle is also used to steer the cart. That could be done by connecting the handle directly to the pivoted wheels so that a rotation of the handle applied a force directly on the wheel mounting structure to rotate it as well. However in the preferred form of the invention the forward wheel or wheels comprise casters capable of independent pivotal action so that very sharp turns are possible. The handle is coupled to the front of the platform and it is mounted, in the preferred embodiment, so that it will turn about a substantially vertical axis.

Thus far described the handle is not an effective instrument for steering the cart. However, it becomes very effective when the handle is connected at a point along its length to the handles of a bowling bag which is itself fixed to the platform. The arrangement is illustrated in FIG. 1. The bag 10 is fixed to the platform 12 by clamps 14, 16, and others. The two front wheels 18 and 20 of the platform are casters which are free to pivot about a vertical axis. The handle 22 is connected to the platform 12 at a "universal" coupling 24. The handle extends upwardly and rearwardly across the top of the bag and then continues upwardly and finally turns to the forward direction where it terminates in a grip portion 26. The grip is disposed substantially directly over the bag, the ball it contains, and the platform 12. At a mid-region of its length the handles is provided with a means 28 by which the handle is connected to the handles 30 of the bag 10. It will be apparent from an examination of FIG. 1 that if the handle 22 had a fixed connection to the platform 12 that the platform could be steered by twisting the grip portion 26. It is also apparent that there would be very little if any mechanical advantage in that arrangement so the grip 26 would have to be twisted in substantially the degree that the cart was to turn. However, the handle is actually connected to the cart through the partly universal coupling 24. It has a connection at the handles 30 to the bag 10 which carries a heavy bowling ball. Because of the weight of the ball the position of the bag, including its handles 30, is relatively fixed. The handles serve as a pivot for the fastening means 28 when the grip portion 26 of the handle is pulled to one side or the other and the bag steers very easily. Because the handle 22 is fixed to the bag at handles 30, lifting the grip 26 results in lifting of the bag 10 by its handles 30 so that the coupling 24 need not be arranged to lift the platform when the grip 26 is raised. The platform is raised because it is fixed to the bag 10. Examination of the figures will show that the connection between handle and platform is only partly universal. If the bag is omitted the platform will swing down when the handle grip is lifted but it will swing down only part way. The connection is arranged in that manner to facilitated moving and lifting the cart in the absence of a bag.

The result of the use of these pivoted wheels, the rotatable connection between the handle and the platform, the location of the grip over the center of the bag and platform, and connection of the handle directly to the bag is the creation of a highly functional but easily produced and relatively inexpensive cart. None of its dimensions are critical. No undue strains are placed on the moving parts. Yet the completed apparatus offers a very convenient way for a bowler to move his ball from a motor vehicle into a bowling alley establishment where he can move it safely through a crowd by having it follow him directly alongside and by providing him with a very efficient means for steering and propelling the cart.

The platform of FIG. 2 is rectangular. Its frame is formed by a light gauge angle member 40 which extends entirely around its periphery. The angle is oriented so that one side forms a marginal lower wall 41. The other side forms a short, upstanding, peripheral protective wall 42. A lateral cross-bar 44 extends transversely across the platform midway along its length. The cross bar ends are connected to the wall 41 at the opposite sides of the platform. A second bar 46 extends the length of the platform midway along its width. It too is fixed at its ends to the frame wall 41. Members 44 and 46 are essentially flat bars and in this case they are welded together at the cross-over region 48. Two Z-shaped brackets are carried by the member 46. They are secured on the member 46 and slideable along that member. They carry thumb screws by which they can be firmly clamped to the member 46. The rearward Z-bracket is identified by the numeral 49 and its thumb screw is numbered 50. The forward Z-bracket 51 carries a thumb screw 52. By these clamps a bag may be fixed to the platform. They may be adjusted so that the bag handles overlie the platform in a selected position.

Other bag fastening devices are also shown in FIG. 2. There are three L-shaped clamps 14. One is mounted midway along the length of the platform on either side and one is mounted at the center rear. These are L-shaped brackets that hook over the outer wall 42 of the frame. Bolts extending upwardly from wall 41 of the frame extend through openings in respectively associated ones of those clamps 14. Wing nuts at the ends of those bolts permit screwing down the clamp into engagement with the margin of a larger bowling ball bag. The tab 56 can also serve to hold down the bag. It extends rearwardly from the upper margin of frame wall 42 from a point midway across the forward part of that wall. To use the tab the bracket 51 is moved forwardly under the tab. In that case the rear of the bag is held by the Z-bracket 49. Conversely if the bracket 49 is moved rearwardly under the rear bracket 14 then that bracket 14 and the forward Z-bracket 51 may be employed to hold down the bag.

The platform of FIG. 2 is fitted with four wheels. The rear wheels 60 and 62 are fixed but the forward wheels 64 and 66 are the wheels of casters which are fixed to the frame 40 at the forward end of the platform.

Finally, the platform includes a handle mount or coupling member 68 which, in this case, has the general shape of an eye-bolt. It is seen in side view in FIG. 3 where it is assembled with the tubular handle 22. The lower end of the handle extends through the opening of the eye-bolt. The handle has a diameter sufficiently smaller than the hole so that the handle is easily rotatable about the axis of the hole. Above and below the coupling member 68 the handle 22 is fitted with enlarged elements 70 and 72, respectively, which are larger than the opening and keep the handle coupled to the member 68. The enlargements 70 and 72 are spaced sufficiently so that an appreciable amount of movement of the handle from the vertical position is permitted. In that sense the coupling is at least partly universal. Rotation need not be unlimited although in the embodiment shown it is. Movement of the handle from the vertical is allowed in order to facilitate connecting the connecting members 28 to the bag handles. However movement is restricted enough so that the platform 12 swings down in only limited degree if the unit is lifted at the grip 26 when the handle is not connected to a bag.

Attachment of the handle by means 28 to the bag is also faciltated by the arrangement, in the preferred embodiment, in which the handle is divided into two sections which are pivotly interconnected at a point between the connecting means 28 and the coupling 24. Advantageously, as illustrated in FIGS. 1 and 3, that pivotal connection is made just below the point at which the bag connecting means 28 is fixed to the handle. The construction is shown in detail in FIG. 4 where the handle 22 is shown to be divided into an upper part 76 and a lower part 78 which are pivoted on a pivot pin 80. The upper part of the lower portion is swaged to smaller diameter so that it telescopes into the lower end of the upper portion 76. The lower end of that upper portion is slotted and the edges of the slot are turned out to form lips 81 and 82. These lips serve as guides and as resilient spring retainer for the lower tube when the latter is pivoted back into alignment with the upper section as it is shown to be in FIG. 4. When the upper part of the handle 76 is pulled forwardly in FIG. 4, downwardly in FIGS. 1 and 3, the lips 81 and 82 are forced apart so that the sections can hinge relative to one another.

The construction of a preferred form of the means 28 by which the handle is attached to the bowling ball bag is shown in detail in FIG. 4. In this embodiment a length of metal strapping is wrapped around the upper part 76 of the handle to form a clamping ring 86 which embraces the handle tightly enough to make a fixed connection. The standing part of the strap at each side of the clamp is then extended in parallel for a distance away from the handle to form a shank. Thereafter the two ends of the straps are bent oppositely to form a pair of hooks which can hook into respectively associated ones of the bale handles of the bag. The two hooks 88 and 90 are formed symmetrically about a plane through the axis of the handle. The intermediate portion of the straps on each side are riveted together by rivets 92 to form a shank for the two hooks.

The embodiment shown in FIGS. 1, 2, 3 and 4 is a universal cart arranged to fit all or most bowling ball bag styles. Other forms are possible and one of those forms is shown in FIG. 5 and 6. Only the platform and lower portion of the handle is shown in those two figures because the remainder of the handle is substantially like what is shown in FIGS. 1, 3 and 4. In FIG. 5 the platform comprises two pans 100 and 102. Both pans are substantially rectangular and both are formed with upstanding walls or lips around three sides. They telescope together in the manner shown in FIG. 5 when assembled so that the non-lipped edge of one is toward the non-lipped edge of the other. The lower pan 102 is provided with slots 104 that extend in parallel in the direction of the length of the platform. Screw fasteners 106 are fixed to the pan 100 and extend to respectively associated ones of the slots 104. Fasteners, not visible in the drawings, on the underside of the platform clamp the two pans together. The rear lip 108 of the pan 100 is bent upwardly and forwardly so that it can engage the lower rear wall of a bag placed on the platform. In like fashion the forward lip 110 of pan 102 extends upwardly and rearwardly so that it can engage the forward lower wall of a bowling ball bag. A bag having been placed on the platform, the two pans 100 and 102 are telescoped together until the lips 108 and 110 engage the bag and hold it firmly. Thereupon the two pans are clamped together using the fasteners 106. In this embodiment the pan 100 is lanced to form two V-shaped sections which are bent downwardly and form the struts for the rear wheels. The wheels are mounted on an axle 112 which extends between those struts. The struts are identified by the reference numerals 114 and 116. The forward wheels are casters as in the case of the embodiment of FIGS. 1 through 4.

In FIG. 5 a tongue 116 extends forwardly from the lower front edge of pan 102. The tongue lies in the plane of the bottoms of pans 100 and 102 and its outer end is perforated to accommodate the lower end of the handle. The construction is shown in greater detail in FIG. 6. The handle 120 extends through the tongue and it is held there by two pins which is this embodiment are shown to extend through the handle one above and one below the tongue at right angles to one another. The upper pin 122 is held in place by C-shaped spring washers 124. It is sufficiently long to prevent passage through the hole in tongue 116. Below the tongue another pin 126 is held in place with a C-washer 128. Like pin 112, pin 126 is sufficiently long so that it will not pass through the hole in tongue 116. Thus a partially universal joint is formed permitting the handle action of the kind described for coupling 24 in the case of the embodiment of FIGS. 1 through 4.

Although I have shown and described certain specific embodiments of my invention, I am fully aware that many modifications thereof are possible. My invention, therefore, is not to be restricted except insofar as is necessitated by the prior art.

I claim:

1. For hauling bags of the kind that have an upper handle, a cart comprising in combination;
   a wheeled platform having a steerable wheel at one end;
   a cart handle connected and extending upwardly from said one end of the platform; and
   connecting means fixed to the handle at a point along its length for connecting the cart handle to the handle of the bag;
   the cart handle being connected to the cart such that it is free to turn about an axis which is substantially vertical when the platform is horizontal.

2. The invention defined in claim 1 in which the upper end of a cart handle comprises a grip portion which extends in a substantially horizontal direction when the cart handle is connected to the handle of a bag.

3. The invention defined in claim 2 in which said grip portion overlies said platform when the cart handle is connected to the handles of the bag.

4. The invention defined in claim 3 in which said handle comprises means in the form of a hinge for lowering and raising the upper portion of said handle toward and away from said platform.

5. The invention defined in claim 4 in which said hinge is located on said handle between the point of connection of the handle to the platform and said means for connecting the handle to a bag.

6. The invention defined in claim 3 in which said cart handle extends in the direction of said one end of the platform at its upper end and there terminates in said grip portion.

7. The invention defined in claim 1 in which said means for connecting the cart handle to the handle of a bag comprises a pair of hooks opening at opposite sides of the cart handle whereby the cart handle will overlie the central plane of a bag on the platform when hooks are hooked through respectively associated ones of a pair of side handles connected to the sides of the bag.

8. The invention defined in claim 1 in which said cart further comprises means for fixing the bag down onto the platform.

9. The invention defined in claim 8 in which said means for fixing the bag on the platform comprises adjustable clamps carried by the platform.

10. The invention defined in claim 8 in which said platform has two, spaced swivel mounted wheels at its forward end and in which said handle has universal mounting to said forward end of the platform between said swivel mounted wheels at a universal mounting such that the handle can be pivoted at said mounting in the vertical plane, when the platform is horizontal and can be rotated at said mounting about said vertical plane.

11. The invention defined in claim 10 in which said handle extends upwardly and rearwardly and thence upwardly and forwardly from said universal mounting and terminates in a grip portion overlying said platform when said connecting means is connected to a bag disposed on said platform.

* * * * *